United States Patent
Klein et al.

(10) Patent No.: US 7,701,880 B2
(45) Date of Patent: Apr. 20, 2010

(54) FIBRE CHANNEL LINK INITIALIZATION

(75) Inventors: Steven E. Klein, Tucson, AZ (US); Daniel W. Sherman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 11/972,470

(22) Filed: Jan. 10, 2008

(65) Prior Publication Data

US 2009/0180382 A1    Jul. 16, 2009

(51) Int. Cl.
*H04L 1/24* (2006.01)
*G06F 15/177* (2006.01)

(52) U.S. Cl. .................... 370/255; 370/235; 370/241; 709/233; 710/60

(58) Field of Classification Search .............. 370/229, 370/231, 241, 235, 241.1, 254, 255, 257; 709/233; 710/60
See application file for complete search history.

(56) References Cited

U.S. PATENT DOCUMENTS

| | | | |
|---|---|---|---|
| 6,477,171 B1 * | 11/2002 | Wakeley et al. | 370/404 |
| 7,477,611 B2 * | 1/2009 | Huff | 370/252 |
| 7,523,227 B1 * | 4/2009 | Yager et al. | 710/16 |
| 2004/0081196 A1 | 4/2004 | Elliott | |
| 2004/0101064 A1 | 5/2004 | Jenkins et al. | |
| 2004/0208180 A1 * | 10/2004 | Light et al. | 370/395.2 |
| 2005/0018650 A1 * | 1/2005 | Dropps et al. | 370/351 |
| 2005/0238064 A1 | 10/2005 | Winter et al. | |
| 2007/0064492 A1 | 3/2007 | Lucas et al. | |
| 2007/0116038 A1 * | 5/2007 | Holt et al. | 370/465 |
| 2007/0127920 A1 | 6/2007 | Ghiasi et al. | |
| 2007/0133562 A1 | 6/2007 | Ghiasi | |
| 2007/0192505 A1 * | 8/2007 | Dalmia | 709/233 |
| 2007/0206947 A1 * | 9/2007 | Natarajan et al. | 398/25 |
| 2008/0256385 A1 * | 10/2008 | Bayus et al. | 714/4 |
| 2008/0310432 A1 * | 12/2008 | Ranjan et al. | 370/401 |
| 2008/0317069 A1 * | 12/2008 | Huang et al. | 370/503 |

FOREIGN PATENT DOCUMENTS

GB    2363040 A    12/2001
JP    2001211194 A    8/2001

* cited by examiner

*Primary Examiner*—Chi H Pham
*Assistant Examiner*—Ahmed Elallam
(74) *Attorney, Agent, or Firm*—Griffiths & Seaton PLLC

(57) ABSTRACT

A method for initializing a fiber channel link upon a failure of a standard speed negotiation algorithm is provided. The standard speed negotiation algorithm is disabled. A link speed is set to a highest possible link speed not yet attempted outside the standard speed negotiation algorithm, initializing the fiber channel link if the link speed is negotiated at a maximum link speed. If the link speed is negotiated at a speed less than the maximum link speed, the standard speed negotiation algorithm is reattempted, initializing the fiber channel link according to the standard speed negotiation algorithm if the reattempt is successful.

20 Claims, 2 Drawing Sheets

FIBRE CHANNEL LINK INITIALIZATION

BACKGROUND OF THE INVENTION

1. Field of the Invention

The present invention relates in general to computers, and more particularly to a system and method for initializing a fibre channel link in a storage area network.

2. Description of the Prior Art

In today's society, computer systems are commonplace. Computer systems may be found in the workplace, at home, or at school. Computer systems may include data storage systems, or disk storage systems, to process and store data. A storage system may include various storage components, such as one or more disk drives configured in a storage environment. For example, the storage environment may include a number of disk drives implemented in an array, such as a Redundant Array of Independent Disks (RAID) topology, to provide data security in the event of a hardware or software failure. The storage environment may also include other storage components, such as controllers and interfaces to mange the flow of data.

Various components in computer systems, such as storage components, may be connected together using a fibre channel protocol, a gigabit speed data transfer technology used in a variety of settings including storage systems. When two fibre channel ports are connected to each other via a fibre channel cable, a link initialization process must complete before the two ports can exchange meaningful data. Part of this link initialization process involves determining the speed at which the link will operate. In most cases, the fibre channel ports can support multiple speeds (e.g., 1 Gb/sec, 2 Gb/sec, 4 Gb/sec) and are normally configured to execute a standard speed negotiation algorithm in order to determine, and thereby operate at, the highest common speed supported by each port. This negotiation algorithm is part of the overall fibre channel standards set by the T11 Technical Committee of the InterNational Committee for Information Technology Standards (INCITS) and the American National Standards Institute (ANSI).

While the standardized speed negotiation algorithm typically results in an optimum connection, there are occasions where the algorithm cannot be completed successfully. A failure can occur for various reasons, such as timing issues caused by large link latencies, noise on the link, or incompatible implementations of the speed negotiation algorithm. A contingency in the event of a failure is not found in the fibre channel standards.

SUMMARY OF THE INVENTION

A need exists for a solution that allows two fibre channel ports to complete link initialization during conditions where the standard speed negotiation algorithm cannot be completed successfully, even though a physical link is present. Accordingly, in one embodiment, by way of example only, a method for initializing a fibre channel link upon a failure of a standard speed negotiation algorithm is provided. The standard speed negotiation algorithm is disabled. A link speed is set to a highest possible link speed not yet attempted outside the standard speed negotiation algorithm, initializing the fibre channel link if the link speed is negotiated at a maximum link speed. If the link speed is negotiated at a speed less than the maximum link speed, the standard speed negotiation algorithm is reattempted, initializing the fibre channel link according to the standard speed negotiation algorithm if the reattempt is successful.

In another embodiment, by way of example only, a system for initializing a fibre channel link upon a failure of a standard speed negotiation algorithm is provided. The system includes a fibre channel adapter configured for disabling the standard speed negotiation algorithm, setting a link speed to a highest possible link speed not yet attempted outside the standard speed negotiation algorithm, initializing the fibre channel link if the link speed is negotiated at a maximum link speed, and if the link speed is negotiated at a speed less than the maximum link speed, reattempting the standard speed negotiation algorithm, initializing the fibre channel link according to the standard speed negotiation algorithm if the reattempt is successful.

In still another embodiment, by way of example only, a computer program product for initializing a fibre channel link upon a failure of a standard speed negotiation algorithm is provided. The computer program product comprises a computer-readable storage medium having computer-readable program code portions stored therein. The computer-readable program code portions include a first executable portion configured to disable the standard speed negotiation algorithm, a second executable portion configured to set a link speed to a highest possible link speed not yet attempted outside the standard speed negotiation algorithm, initializing the fibre channel link if the link speed is negotiated at a maximum link speed, and a third executable portion configured to, if the link speed is negotiated at a speed less than the maximum link speed, reattempt the standard speed negotiation algorithm, initializing the fibre channel link according to the standard speed negotiation algorithm if the reattempt is successful.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
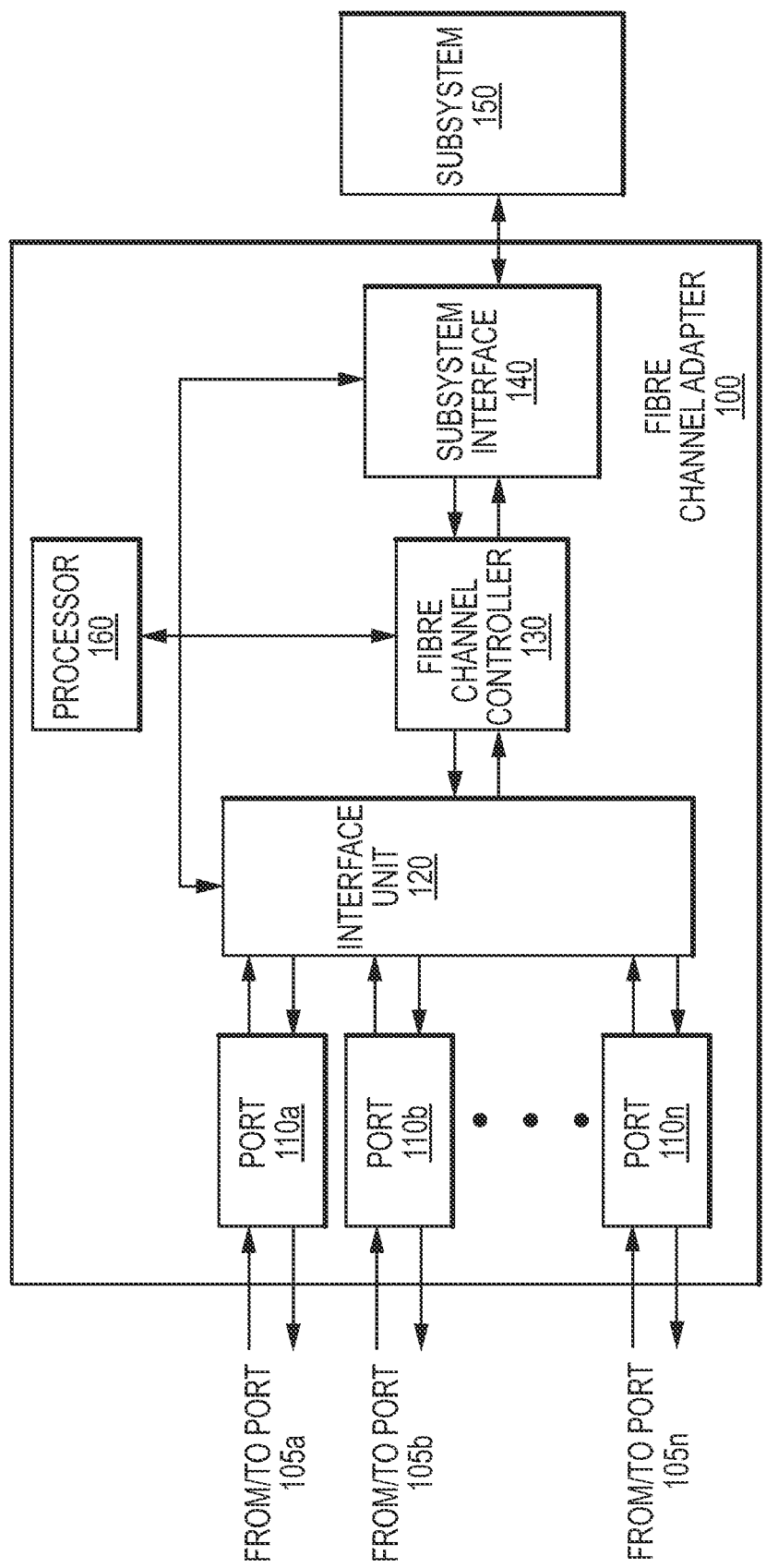
FIG. 1 is a schematic block diagram illustrating one embodiment of a fibre channel adapter.

Computer systems in general and International Business Machines (IBM) compatible personal computer systems in particular have attained widespread use for providing computer power to many segments of today's modern society. Computer systems typically include a system processor and associated volatile and non-volatile memory, a display area, input means, and often interfaces, such as a network interface or modem, to other computing devices.

One of the distinguishing characteristics of these systems is the use of a system board to electrically connect these components together. These computing devices are information handling systems which are designed primarily to give independent computing power to a single user, or a group of users in the case of networked computing devices. Personal computing devices are often inexpensively priced for purchase by individuals or businesses. Nonvolatile storage devices such as hard disks, CD-ROM drives and magneto-optical drives are considered to be peripheral devices. Computing devices are often linked to one another using a network, such as a local area network (LAN), wide area network (WAN), or other type of network. As described previously, computer systems can also be interconnected using a fibre channel network. By linking to other computer systems, a computing device can use resources owned by another computing device. These resources can include files stored on nonvolatile storage devices and resources such as printers and storage area networks (SANs). Fibre channel can be used to connect these devices and resources, including connecting computer systems to storage devices such as SAN devices.

Fibre channel is a high speed medium used for data transfer and storage. It is essentially a serial data channel preferably created over fiber optic cabling. Fibre channel provides a logical bi-directional, point-to-point connection between a host and a device. Similar to networking technologies using local area network (LAN) or wide area network (WAN) configurations, fibre channel also is used to connect PCs, servers, printers, and storage devices. Because fibre channel allows the use of fiber optic cabling, connections along a fibre channel network makes it possible to transfer data at greater distances. In addition, fibre channel makes high-speed data transfers possible. Fibre channel also provides increased bandwidth over communication channels.

Channels and networks are the two primary ways that data is transferred between devices. Such devices include processors and peripherals such as printers and storage devices. Channels transfer data through switched or direct point to point connections. Channels work by creating a fixed connection between the source and destination devices until the transfer is complete. Channels transfer data at high speeds and are economical. Networks (i.e., LAN or WAN), on the other hand are collections of nodes such as processors, print devices, and workstations. Connections on networks are typically slower than those made via channels. Also, because networks are software intensive, they are much more expensive due to upgrade and compatibility issues. Channels work best among few devices and connect via predefined addresses. Networks, on the other hand, can handle multiple requests among multiple connections.

Fibre Channel is hybrid of both network and channel methods. Consequently, Fibre channel is often considered an I/O (input/output) interface that combines the best of networks and channels. In addition, fibre channel systems can be configured in different ways depending on needs of the user, thus providing flexibility in an ever changing systems environment.

Devices are connected on Fibre Channel systems using various interconnection topologies. Interconnection devices available for use on Fibre Channel are switches, hubs, and bridges. The ability of fibre channel to use different interconnect devices makes it scalable depending on user needs. For small fibre channel networks, hubs and bridges may be used for connecting devices in a topology called Fiber Channel Arbitrated Loop (FC-AL). As fibre channel networks get larger and network demands increase, switching may be implemented. A switched fibre channel network is called a "fabric." A fabric is simply the underlying switching architecture used by a fibre channel switch. A fabric may contain many loops interconnected with switches.

As described previously, the standard link initialization algorithm provided as part of the overall fibre channel family of standards works to generally negotiate an appropriate speed in which a link between two fibre channel devices (ports) may operate. In some cases, however, two attached fibre channel ports may be unable to negotiate a common speed. This failure can again, occur for various reasons such as timing issues caused by large link latencies (due to long lengths of cable, for instance), noise on the link, or incompatible implementations of the standard speed negotiation algorithm. For example, various fibre channel extenders, devices which allow a fibre channel cable to be connected to an additional fibre channel cable, have difficulty implementing a standard speed negotiation algorithm. Specifically, the two fibre channel ports on each side of the channel extender are unable to negotiate speed across the extended link using the standard speed negotiation algorithm. This results in a failed link initialization attempt. Again, the relevant fibre channel standards are silent as to a contingency for such a failure.

One solution to the problem is to require a user to force both fibre channel ports to a maximum possible speed common to both ports that each port may operate. This solution may be inadequate for two reasons. First, if the link was previously operational and subsequently has a failure and is unable to initialize on its own, a large amount of time may pass before the user becomes aware of a problem during link initialization. Second, in cases where the link was never operational, the link speed must be hard set before the user can use the link. Both cases result in additional work for a user by forcing both fibre channels to a given speed. In addition, when the user changes his environment again and one of the fibre channel ports that were previously set to a single link speed has a change in its attachment, additional work is created for the user.

The present description and claimed subject matter allow for a fibre channel link initialization to be completed successfully even when the standard speed negotiation algorithm has a failure. A turnkey link initialization process is presented that prevents the need for user intervention. When a fibre channel port is presented with a situation where the fibre channel port is configured to negotiate speed but the port hardware is unable to bring the link online using the standard speed algorithm, the fibre channel upper layer protocol is configured to perform an algorithm that first scans for compatible link speeds. Once a range of compatible link speeds is determined, including a maximum link speed and a minimum link speed, the protocol disables standard speed negotiation (disabling the link's standard speed negotiation protocol) and hard sets the link speed to the highest possible link speed in the range of compatible link speeds. The protocol cycles through this list of link speeds from highest to lowest, attempting to initialize the link at each speed. As a next step, if the link negotiation is successful and the protocol determines that the link was negotiated at the highest speed possible, the link is initialized.

If the protocol determines that the link speed was not negotiated at the highest possible speed, the protocol reattempts, for one instance, the standard speed negotiation algorithm. If the standard speed negotiation algorithm is successful, the link is again initialized according to the standard algorithm. If the standard algorithm is not successful, the protocol again disables standard speed negotiation and hard sets the link speed to the highest possible link speed determined in the previous step. If the link negotiation is unsuccessful, the link speed is decremented until the link negotiation is successful and the link may be initialized.

FIG. 1 is a schematic block diagram of an exemplary fibre channel adapter 100 is illustrated. A first fibre channel port 105*a* (not shown) is electrically connected to an associated port 110*a* of adapter 100. Similarly, ports 105*b* and 105*n* are associated with ports 110*b* and 110*n*, respectively. As one skilled in the art will appreciate, port 105*a* may be integrated into or associated with a connected device, such as an additional storage component. The connected device may have an additional fibre channel adapter 100 in which the ports 105*a-n* are integrated.

Fibre channel adapter 100 may be integrated into a fibre channel extender device previously described, where a port 110*a* may accept a first fibre channel cable and port 110*b* may accept a second fibre channel cable to connect the first and second cables together. Each of the ports 110*a-n* can provide access to bi-directional input/output (I/O) data links. The data links allow various components of a computer system to be interconnected as previously described. For example, the data links may provide a mechanism by which host requests for access to the resources of a SAN can be received and passed on to associated storage devices and communication between storage routers can take place.

To facilitate such communication, adapter may contain such components as an interface unit 120, a fibre channel controller 130, a processor 160, and a subsystem interface 140. Such components as a fibre channel controller 130 and/or a processor 160 provide hardware mechanisms by which to execute various aspects of the instant description and claimed subject matter. For example, the standard speed negotiation algorithm may be executed by processor 160 operational on adapter 100. Further, aspects of the presently described protocol and claimed subject matter, such as hard setting a link speed may be executed on the fibre channel controller 130, processor 160, or elsewhere. A subsystem interface 140 connects the adapter 100 to a subsystem 150, such as a particular storage environment of a storage area network. In one embodiment, various aspects of the instant description may take place coincidentally on an additional adapter 100.

Figure 2:
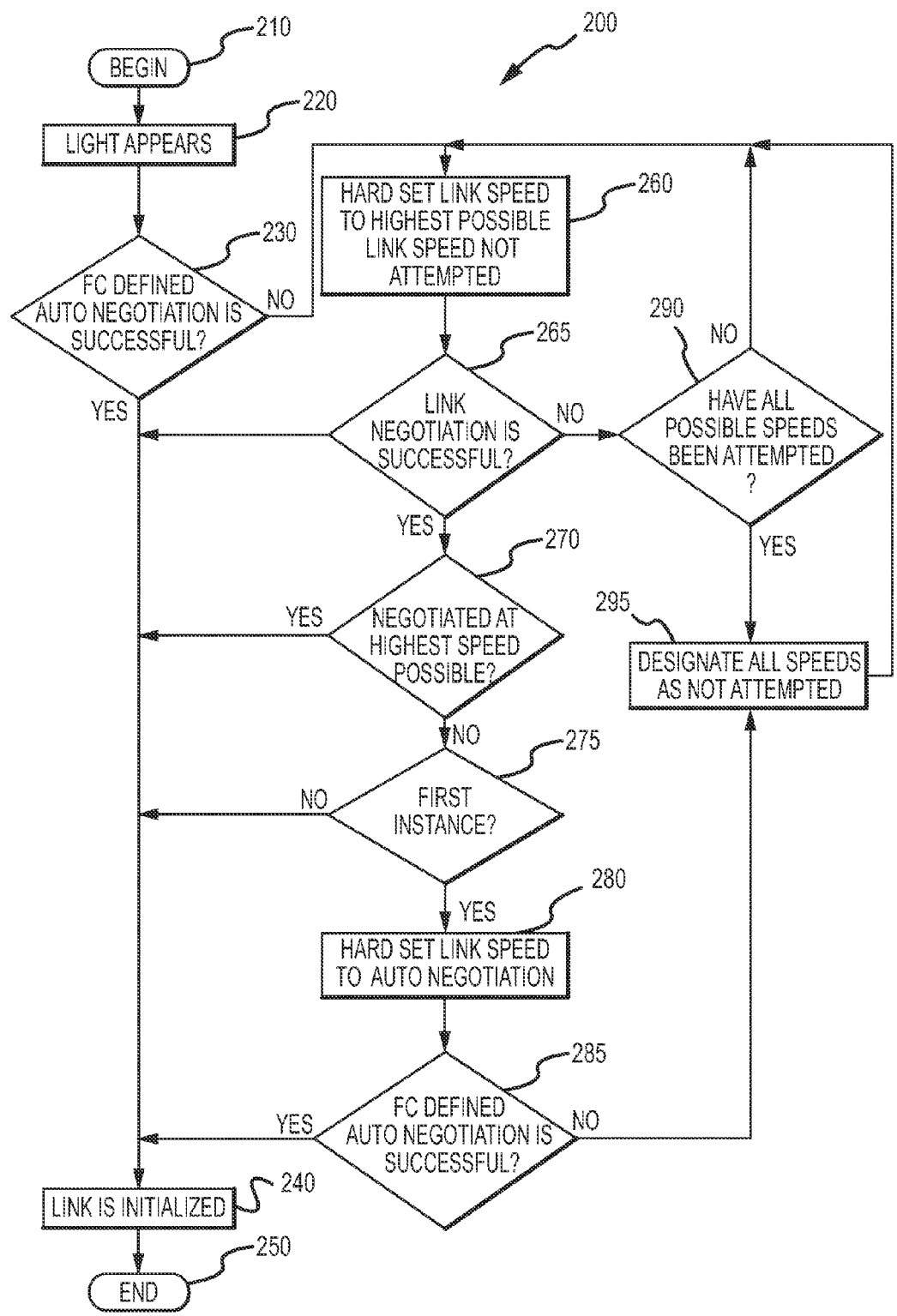
FIG. 2 is a schematic flow chart diagram illustrating one embodiment of a method for initializing a fibre channel link.

A schematic flow chart diagram of an exemplary method 200 of initializing a fibre channel link is illustrated in FIG. 2. In one embodiment, method 200 is implemented as upper level protocol in combination with a standard speed negotiation algorithm implemented as lower level protocol operational on fibre channel adapter 100 (FIG. 1). Method 200 begins (step 210) by the establishment of a physical link between two connected fibre channel ports. The physical link, in one embodiment, may be indicated by various hardware such as adapter 100 (FIG. 1) by use of a light emitting diode (LED) which is activated (step 220).

In one embodiment, once a physical link is established between components, the fibre channel upper layer protocol may execute an algorithm that first scans connected subcomponents for compatible link speeds. The method then initiates the standard speed negotiation algorithm. If execution of the standard speed negotiation algorithm (denoted by FC Defined Auto Negotiation) is successful (step 230), then the link is initialized according to the fibre channel standard (step 240). The method 200 then ends (step 250).

However, if the negotiation fails (again step 230), then the upper level protocol hard sets the link speed to the highest possible link speed in the range of compatible link speeds that has not already been attempted (step 260). In this case, a link speed that has not already been attempted refers to link speeds not attempted while standard speed negotiation has been disabled (not "hard set") or not attempted by the upper level protocol. The standard speed negotiation algorithm may try all speeds due to the fact that the lower level standard speed negotiation protocol is not aware of what the upper level protocol is trying. If this is the first attempt by the upper level protocol to force link speed, the link speed is set to the highest speed capable by the fibre channel port. If this is not the first attempt by the upper level protocol to force link speed, the link speed is set to the next highest speed capable by the fibre channel port that has not been attempted. If all speeds have been attempted, the method designates all speeds as attempted (step 295) and returns to step 260.

For example, the upper layer protocol may attempt speed negotiation at a speed of 8 Gb/sec but is unsuccessful. The next highest speed in the range of compatible link speeds is 4 Gb/sec. As a result, the upper layer protocol hard sets the respective link speed to 4 Gb/sec.

If the link negotiation is successful (step 265) and the protocol determines that the link was negotiated at the highest speed possible (step 270), the link is initialized at that speed (again step 240) and the method 200 ends (again step 250). However, if the method 200 determines that a higher link speed is possible, then the method 200 checks if this is the first time a hard set link speed is successful (step 275). If the method 200 determines that this is the first time, the method reattempts the standard link speed negotiation algorithm (step 280). If the reattempt of the standard algorithm is successful (step 285), then the link is initialized according to the reattempted algorithm (again step 240) and the method 200 ends (again step 250).

Likewise, if the method 200 determines that this is not the first time a hard set link speed is successful (again step 275) then the link is initialized with the current hard set link speed (again step 240) and the method ends (again step 250).

If the standard algorithm again fails (step 285), method 200 then designates all speeds in the range as "not attempted" (again step 295). The method 200 then returns to step 260 to hard set the link speed to the highest possible speed, since all possible speeds have been designated as not attempted. In effect, the process of decrementing speeds begins anew.

If the speed is successfully negotiated (again step 265) the system is, by default, satisfied that the negotiated speed is the fastest common speed between the two components (step 270) and the link is initialized (again step 240) and the method 200 ends (again step 250).

Finally, returning to step 260, if the link negotiation continues to be unsuccessful, then the method 200 (after querying whether all possible speeds have been attempted in step 290) continues to return to step 260 to hard set a link speed to the highest possible link speed not attempted, in effect decrementing the speed until negotiation is successful. If the negotiated speed is successful, the method 200 continues as previously described to initialization (again step 240) and ending (again step 250). The method continues to decrement link speeds (or in some cases, starting anew to decrement speeds from the highest possible speed) until the negotiated speed is successful and the link may be initialized.

Once the method 200 has ended and a link has successfully been initialized, an indicator such as a LED light or a similar indicator may be enabled to show to a user that the link has been initialized. For example, a LED light on adapter 100 may be activated by processor 160 (FIG. 1). Similarly, the adapter 100 may notify a user through interface 140 and subsystem 150 that the link is operational, such as sending an email notification or logging an entry. The processor 160 may activate the notification in a similar manner as the indicator. The indicator or notification may also show the link speed. For example, an LED indicator may display a particular color for an indicated speed. The maximum speed may be indicated by a green color, for example.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for initializing a fibre channel link upon a failure of a standard speed negotiation algorithm, comprising:
   disabling the standard speed negotiation algorithm;
   setting a link speed to a highest possible link speed not yet attempted outside the standard speed negotiation algorithm, initializing the fibre channel link if the link speed is negotiated at a maximum link speed; and
   if the link speed is negotiated at a speed less than the maximum link speed, reattempting the standard speed negotiation algorithm, initializing the fibre channel link according to the standard speed negotiation algorithm if the reattempt is successful.

2. The method of claim 1, further including, if the reattempt is unsuccessful, resetting the link speed to the highest possible link speed not yet attempted outside the standard speed negotiation algorithm, and if the resetting the link speed is unsuccessful, decrementing the link speed until the fibre channel link is initialized.

3. The method of claim 1, further including determining a plurality of possible link speeds compatible with the fibre channel link.

4. The method of claim 3, wherein the plurality of possible link speeds includes the highest possible link speed not yet attempted outside the standard speed negotiation algorithm, the maximum link speed and a minimum link speed.

5. The method of claim 1, further including indicating the fibre channel link is initialized.

6. The method of claim 1, further including notifying a user that the fibre channel link is initialized.

7. The method of claim 5, wherein indicating the fibre channel link is initialized includes indicating the link speed.

8. A system for initializing a fibre channel link upon a failure of a standard speed negotiation algorithm, comprising:
   a fibre channel adapter configured for:
      disabling the standard speed negotiation algorithm,
      setting a link speed to a highest possible link speed not yet attempted outside the standard speed negotiation algorithm, initializing the fibre channel link if the link speed is negotiated at a maximum link speed, and
      if the link speed is negotiated at a speed less than the maximum link speed, reattempting the standard speed negotiation algorithm, initializing the fibre channel link according to the standard speed negotiation algorithm if the reattempt is successful.

9. The system of claim 8, wherein the fibre channel adapter is further configured for, if the reattempt is unsuccessful, resetting the link speed to the highest possible link speed not yet attempted outside the standard speed negotiation algorithm, and if the resetting the link speed is unsuccessful, decrementing the link speed until the fibre channel link is initialized.

10. The system of claim 8, wherein the fibre channel adapter is further configured for determining a plurality of possible link speeds compatible with the fibre channel link.

11. The system of claim 10, wherein the plurality of possible link speeds includes the highest possible link speed not yet attempted outside the standard speed negotiation algorithm, the maximum link speed and a minimum link speed.

12. The system of claim 8, wherein the fibre channel adapter is further configured for indicating the fibre channel link is initialized.

13. The system of claim 8, wherein the fibre channel adapter is further configured for notifying a user that the fibre channel link is initialized.

14. The system of claim 13, wherein the fibre channel adapter is further configured for indicating the link speed.

15. A computer program product for initializing a fibre channel link upon a failure of a standard speed negotiation algorithm, the computer program product comprising a computer-readable storage medium having computer-readable program code portions stored therein, the computer-readable program code portions comprising:
   a first executable portion configured to disable the standard speed negotiation algorithm;
   a second executable portion configured to set a link speed to a highest possible link speed not yet attempted outside the standard speed negotiation algorithm, initializing the fibre channel link if the link speed is negotiated at a maximum link speed; and
   a third executable portion configured to, if the link speed is negotiated at a speed less than the maximum link speed, reattempt the standard speed negotiation algorithm, initializing the fibre channel link according to the standard speed negotiation algorithm if the reattempt is successful.

16. The computer program product of claim 15, further including a fourth executable portion configured to, if the reattempt is unsuccessful, reset the link speed to the highest possible link speed not yet attempted outside the standard speed negotiation algorithm, and if the reset of the link speed is unsuccessful, decrement the link speed until the fibre channel link is initialized.

17. The computer program product of claim 15, further including a fourth executable portion configured to determine a plurality of possible link speeds compatible with the fibre channel link.

18. The computer program product of claim 15, wherein the plurality of possible link speeds includes the highest possible link speed not yet attempted outside the standard speed negotiation algorithm, the maximum link speed and a minimum link speed.

19. The computer program product of claim 15, further including a fourth executable portion configured to indicate the fibre channel link is initialized.

20. The computer program product of claim 19, wherein the fourth executable portion configured to indicate the fibre channel link is initialized indicates the link speed.

* * * * *